Sept. 19, 1950      R. J. WITKOWSKI      2,523,083
ELECTRICALLY BONDED SHOCKMOUNT
Filed Aug. 20, 1948
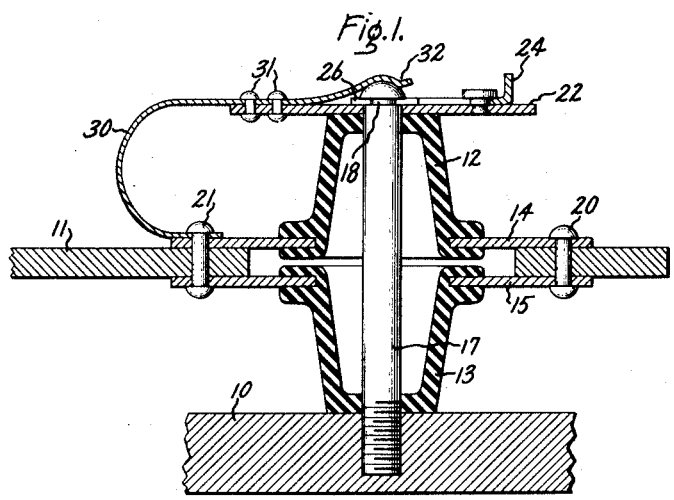
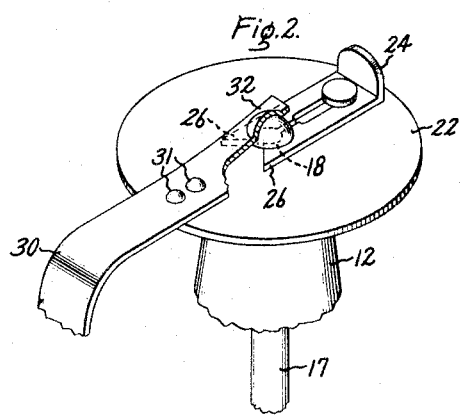
Inventor:
Raymond J. Witkowski,
by His Attorney.

Patented Sept. 19, 1950

2,523,083

UNITED STATES PATENT OFFICE 2,523,083

ELECTRICALLY BONDED SHOCKMOUNT

Raymond J. Witkowski, Syracuse, N. Y., assignor to General Electric Company, a corporation of New York Application August 20, 1948, Serial No. 45,230

4 Claims. (Cl. 173—324)

This invention relates to shockmount assemblies utilized for protecting electric apparatus from mechanical vibrations, and more particularly to shockmount assemblies used for mounting detachable electric apparatus where electrical bonding or grounding of the apparatus is also required.

It has become common practice to mount electric apparatus in vehicles and aircraft in such a way that it can be easily removed, when necessary, for servicing or for other reasons. For this purpose, recourse has generally been had to resilient rubber mounts and to simple snap-on devices for locking purposes. Grounding of the apparatus has been accomplished through the snap-on devices or through accessory straps. The first method of grounding provides an electrical contact which is very irregular and by no means reliable. The second method has the disadvantage of requiring an extra operation during the mounting process, and is consequently inconvenient. My invention provides a new and novel device for automatically grounding the shock-mounted apparatus in which grounding follows naturally from properly locking the apparatus in the shockmount.

According to my invention, the grounding of the apparatus is achieved by means of a flexible strap terminating in a spring finger which makes positive galvanic contact with a metallic member of the shockmount assembly directly connected to the body of the vehicle.

It is an object of this invention to provide an improved shockmount assembly which permits rapid installation or removal of electrical apparatus and which simultaneously insures a positive grounding of the apparatus when installed.

It is another object of this invention to provide an improved quick-detachable shockmount assembly in which a simple mechanical operation not only locks it securely in place but also provides a positive electrical bond between a supporting member and a supported member.

A further object of this invention is to provide an improved shockmount incorporating a grounding device which will maintain electrical apparatus in constant electrical contact with the body of the vehicle in which it is mounted in spite of mechanical vibration and shocks.

For additional objects and advantages and for a better understanding of the invention, attention is now directed to the following description and accompanying drawing, and also to the appended claims in which the features of the invention believed to be novel are particularly pointed out.

In the drawing, Fig. 1 shows a vertical section through a shockmount assembly embodying my invention; and Fig. 2 is a perspective view of the upper portion of Fig. 1.

Referring to the drawing, there is shown a support 10 which may form an integral part of the vehicle or aircraft in which the apparatus is mounted. A plate 11 represents a section of the chassis supporting the electrical apparatus. A metallic stud 17 is screwed into the support 10 to permit locating the shockmount members on it.

The flexible elements of the shockmount are provided by two hollow conical rubber bushings 12 and 13 having shoulders which are molded integrally with mounting plates or bases 14 and 15 respectively. These bushings are mounted coaxially with stud 17 on either side of the chassis 11 and their mounting plates are secured to the chassis by means of rivets 20 and 21. The bushings are mounted so that stud 17 extends beyond them a slight amount. The upper rounded end or head of the stud is formed with an annular groove 18. A snubber washer 22 carrying a slotted slide fastener 24 is mounted on top of the upper bushing concentric with it about the stud 17. The slide fastener has projecting fingers 26, as best shown in Fig. 2, which are shaped to lock on the annular ring of the stud when pushed up against it. This permits mechanically locking the assembly in place and yet allows the chassis 11 a certain limited freedom of movement with respect to the support 10.

In accordance with my invention, a flexible strap 30 is provided which is bonded at its lower end to the chassis 11 by means of a rivet 21 and which is projected at its upper end into a spring finger 32. The strap is secured at an intermediate point to the snubber washer by means of two rivets 31 which locate its upper extremity in a definite spatial relationship with respect to the washer. When the assembly is locked in position by means of the slide fastener, the spring finger 32 rests against the head of the stud making electrical contact and exerts a positive pressure against it. The grounding circuit from the chassis to the support is then completed through the rivet 21, strap 30, finger 32, and stud 17. This method of grounding has the advantage that there is always a positive contact at the one point where high resistance might develop, namely at the junction of the finger 32, and of the stud 17. Moreover, there is relatively no movement of the washer with respect to the stud due to vibration of shocks received by the support, and consequently no movement at the contact. Any movement takes place between the chassis 11 and the washer but does not effect the electrical contact, since the movement is taken up by the flexible strap 30.

In a particular construction of this embodiment, it was found on test that the resistance from the chassis 11 to the support 10 through the grounding circuit was less than one tenth of a milliohm. The method of bonding that had been previously employed omitted the spring finger 32 and comprised only the bonding strap 30. The grounding circuit then was through the strap 30, the rivet 31, the washer 22, the slide fastener 24, and the stud 17. There are two points of high contact resistance in this circuit: the contact between the slide fastener and the washer, and the contact between the slide fastener and the annular ring and the mounting stud. The resistance at these points varied considerably due to vibration and was found on test to have an average value of approximately forty milliohms when the equipment was at rest. When subjected to heavy vibration, the grounding resistance varied between wide limits and open circuits developed momentarily.

While I have shown in my embodiment, a spring finger which is made integral with the grounding strap, it will be obvious to those skilled in the art that the two can be made of discrete parts and secured individually to the snubber washer. However, making the spring finger and the grounding strap of one piece has the advantage of obviating the possiblity of contact resistance developing at the joint with the snubber washer. I have also shown the spring finger as exerting the pressure on the head of the mounting stud. It will also be evident to those skilled in the art that there are many definite ways of locating the spring finger so as to insure a positive contact with the stud.

While the specific embodiment has been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States, is:

1. A detachable shockmount assembly for providing mechanical and electrical connection between two bodies, comprising a hollow, resilient, substantially non-conducting member attached to one of said bodies, a metallic stud projecting through said member and secured to the other of said bodies at one end, said stud having a lateral depression near its free end, a snubber washer provided with a fastening device, said device engaging in said depression and mechanically locking said resilient member on said stud, and a flexible conducting strap fastened to said one body at one end and to said washer at an intermediate point, said strap having its free end arranged to make an electrical pressure contact with the free end of said stud.

2. A detachable shockmount assembly for providing mechanical and electrical connection between a load and a support, comprising a hollow, resilient, substantially non-conducting member having its outer periphery secured to said load, a metallic stud mounted on said support at its lower end and projecting through the center of said member, said stud having an annular groove near its free end, a washer provided with a slide fastener arranged to engage said groove and mechanically lock said member on said stud, a flexible conducting strap conductively fastened to said load at one end and to said washer at the other end, and a spring member mounted on said washer and making an electrical connection with said strap and located to engage the free end of said stud and to exert galvanic contact pressure against it when said slide fastener is engaged in said groove.

3. A detachable shockmount assembly for providing mechanical and electrical connection between a plate and a bracket, comprising a hollow, resilient, substantially non-conducting member having its outer periphery secured to said bracket, a metallic stud secured to said plate at one end and projecting through the center of said member, said stud having an annular groove near its free end, a washer provided with a fastener arranged to engage said groove and to mechanically lock said member on said stud, a flexible conducting strap conductively fastened to said bracket at one end and to said washer at the other end, and a spring member mounted on said washer and electrically connected to said strap, said spring member being located to engage the free end of said stud and to exert a galvanic contact pressure against it when said fastener is engaged in said groove.

4. A detachable shockmount assembly for providing mechanical and electrical connection between a mounting plate and a support comprising a pair of tubular, resilient, substantially non-conducting members each having a base and a shoulder, said bases being secured to said plate in such positions that said shoulders are symmetrically disposed on either side of said plate, a metallic stud secured to said support at one end and projecting through both said members, said stud having an annular groove near its free end, a washer provided with a slide fastener arranged to engage said groove and to mechanically lock said washer on said stud, thereby to restrain axial displacement of said shoulders on said stud, a flexible conducting strap conductively fastened to said plate at one end and to said washer at the other end and a spring member mounted on said washer and electrically connected to said strap, said spring member being located to engage the free end of said stud and to exert galvanic contact pressure against it when said slide fastener is engaged in said groove.

RAYMOND J. WITKOWSKI.

REFERENCES CITED

The following references are of record in the file of this patent:

UNITED STATES PATENTS

| Number | Name | Date |
| --- | --- | --- |
| 1,827,779 | Brindley | Oct. 20, 1931 |
| 2,245,460 | Bundy | June 10, 1941 |
| 2,455,891 | Flanagan | Dec. 7, 1948 |